Patented Sept. 27, 1932

1,879,539

UNITED STATES PATENT OFFICE

KARL SCHRANZ AND HANS-PAUL MULLER, OF ELBERFELD, GERMANY, ASSIGNORS TO WINTHROP CHEMICAL COMPANY, INC., OF NEW YORK, N. Y., A CORPORATION OF NEW YORK

DOUBLE COMPOUNDS OF THE ACRIDINE SERIES

No Drawing. Application filed December 9, 1929, Serial No. 412,936, and in Germany December 13, 1928.

The present invention relates to new double compounds of 3.6-diamino-10-alkyl-acridinium salts with salts of 3.6-diamino acridine, more particularly it relates to double compounds of the probable general formula:

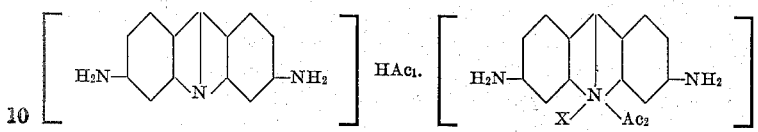

wherein $Ac_1$ and $Ac_2$ represent similar or dissimilar acid radicals, such as, of hydrochloric-, hydrobromic-, hydroiodic-, nitric-, sulfuric-, acetic-, lactic-, benzoic-, salicylic-, para-toluene sulfonic acid, and the like, and X stands for an alkyl group, such as methyl, ethyl, propyl, isopropyl, or the like.

The new double compounds of a constant composition form red crystals of a deeper coloration than that of each of their components when distributed to the same degree of fineness. They are decomposed at a temperature above about 200° C. without melting; they are valuable media for medical purposes, especially as antiseptics, and are in view of their considerable solubility in water more advantageous than each of their components and the simple mixtures of the components. Thus, by the application of our double compounds, aqueous solutions up to about the 50-fold concentration are obtainable in comparison with the single components or a simple mixture thereof. The degree of solubility is dependent on the kind of the acid and alkyl residues contained in the double compounds. The double compounds dissolve more quickly in water than each of their components and the simple mixtures thereof. The solutions have a neutral reaction and are not irritant when injected for therapeutical purposes, contrary to the aqueous solutions of their components. Therefore, these double compounds represent the up to date optimal form for the appliance of 3.6-diamino acridine compounds in medicine. The new double compounds may be produced according to several methods, for instance, by combining of a mono salt of a 3.6-diamino-10-alkyl-acridinium base with the mono salt of 3.6-diamino acridine. Alternatively an acid quaternary salt may be combined with 3.6-diamino-acridine or the quaternary base with an acid salt of 3.6-diamino-acridine. Furthermore, the acid salts or one acid and one mono salt can be caused to react with one another, and the excess of acid is then removed by the addition of a basic agent. Obviously the same result is obtained by first dissolving or suspending in a solvent the 3.6-diamino-acridine together with the quaternary base or either component with a salt of the other having insufficient total acid groups and then neutralizing by the addition of an acid.

The reaction begins already in the cold, for example when shaking for some time the two components with water; heating is, however, advantageous in order to shorten the time of reaction. Besides water, other solvents, such as, for example, ethylalcohol, glycol, glycerine and pyridine, can be used as media for the reaction.

Instead of starting with the pure components above mentioned there may be used the technical products, obtainable, for instance, by alkylating 3.6-di-acetylamino-acridine by means of toluene sulfonic acid methylester in nitrobenzene solution while heating to about 175° C. and splitting off the acetyl radicals by saponifying with dilute hydrochloric acid, which products, as we have found, always still contain unalkylated parts besides the alkylated ones.

By analyzing such a mixture the proportion of the components to each other can be determined, and, according to the result, the part of the component failing to the molecular proportion necessary for the formation of the double compounds is added, and the double compound is produced according to the above stated processes.

Furthermore, it has been found that the already known alkylating process applied to 3.6-diamino-acridine or its derivatives can be performed in such a manner as to yield the double compounds directly.

In this process of forming the double compounds directly the result obtained depends on the temperature as well as on the amount of alkylating agent and the solvent used. Generally, the application of a high temperature necessitates the diminution of the alkylating agent, and, vice versa, an excess of the alkylating agent demands the reducing of the temperature.

The invention is illustrated by the following examples, without being restricted thereto:

Example 1

To 26 parts by weight of 3.6-diamino-10-methylacridinium chloride a solution of 24.5 parts by weight of 3.6-diamino-acridine hydrochloride, heated to 80° C., is added, and the temperature is maintained at 80° C. for some time. Thus a solution of the double compound: 3.6-diamino-10-methylacridinium chloride-3.6-diamino-acridine hydrochloride is obtained, from which solution the double compound is separated by salting out or by evaporation to dryness. When recrystallized from water, it forms fine brick-red crystals, which dissolve in water to the extent of about 15% at room temperature. The new compound may be represented by the probable formula:

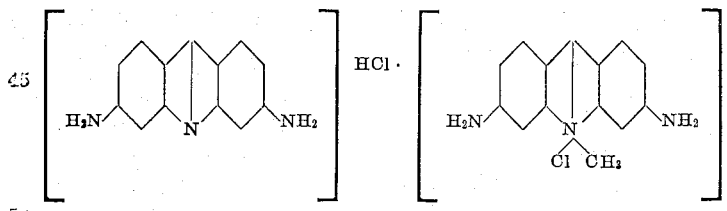

The same double compound is produced, when a solution of 24.1 parts by weight of the quaternary 3.6-diamino-10-methylacridinium hydroxide (obtainable, for example, from the solution of the sulfate by treatment with baryta water and subsequent filtration) is mixed with 28.2 parts by weight of the dihydrochloride of 3.6-diamino-acridine.

As compared with the new product thus obtainable, water dissolves at room temperature:—

3.6-diamino-10-methylacridinium chloride to the extent of about 1–2%.

3.6-diamino-acridine hydrochloride to about 1% and 3.6-diamino-acridine dihydrochloride to about 0.1%.

Example 2

To an aqueous solution of 29.6 parts by weight of the hydrochloride of 3.6-diamino-10-methylacridinium chloride are added at 80° C. 28.2 parts by weight of 3.6-diamino-acridine-dihydrochloride. After heating for a short time the excess acid is neutralized with 200 parts by weight of 1 N. caustic soda. From the solution thus obtained the double salt already described in Example 1 can be obtained by salting out.

Example 3

On adding 20.9 parts by weight of 3.6-diamino-acridine base to a suspension of 32.1 parts by weight of acid 3.6-diamino-10-methylacridinium sulfate while stirring at 60° C. and maintaining the temperature for some time at 60° C. a solution of the double compound: 3.6-diamino-10-methylacridinium sulfate-3.6-diamino-acridine sulfate of the probable composition:

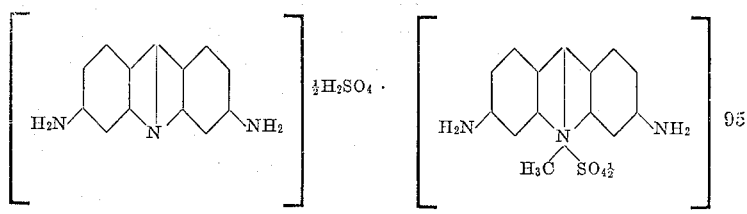

is obtained. This double compound is soluble in water at room temperature to the extent of about 5%.

The solubility in water at room temperature of the 3.6-diamino-10-methylacridinium sulfate is below 0.1%, that of the 3.6-diamino-acridine sulfate at about 1%.

Example 4

27.4 parts by weight of 3.6-diamino-10-ethylacridinium chloride are dissolved in 200 parts by weight of water at 60° C., and a solution of 24.5 parts by weight of 3.6-diamino-acridine hydrochloride in 200 parts by weight of water is added. The mixture is heated for some 3 hours on the boiling water bath, and the double compound thus obtained is separated by careful evaporation of the liquid to dryness or salting out.

The double compound 3.6-diamino-10-ethylacridinium chloride-3.6-diamino-acridine hydrochloride of the following probable composition:

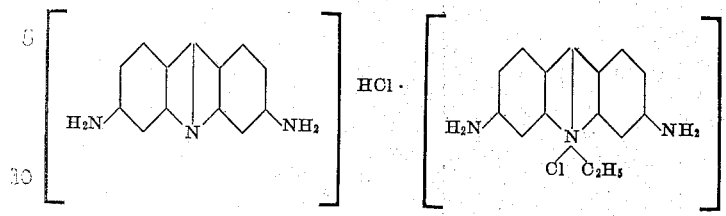

forms brick red crystals, which readily dissolve in water at room temperature. 100 cc. of a saturated aqueous solution contain 52.7 grams of this double compound, while 100 cc. of a saturated aqueous solution of 3.6-diamino-10-ethylacridinium chloride contain only 9.3 grams of the acridinium compound.

Example 5

24.5 parts by weight of 3.6-diamino-acridine hydrochloride are dissolved in 4000 parts by weight of boiling absolute alcohol and combined with a boiling solution of 26 parts by weight of 3.6-diamino-10-methylacridinium chloride in 2000 parts by weight of absolute alcohol. An alcoholic solution of the double compound described in Example 1 is thus obtained; the double compound can be separated, for example, by careful evaporation of the alcoholic solution.

In an analogous manner other organic solvents, such as, for example, glycerol, acetone or pyridine, can be employed for the production of the said double compounds of the acridinium series with the same satisfactory results.

Example 6

26 parts by weight of 3.6-diamino-10-methylacridinium chloride are mixed with 25.8 parts by weight of 3.6-diamino-acridine sulfate, and the mixture is dissolved in 900 parts by weight of water at a temperature of 80° C. After about 3 to 4 hours' heating at this temperature the solution is evaporated to dryness. The double compound from 3.6-diamino-10-methylacridinium chloride and 3.6-diamino-acridine sulfate which may be represented by the following probable formula:

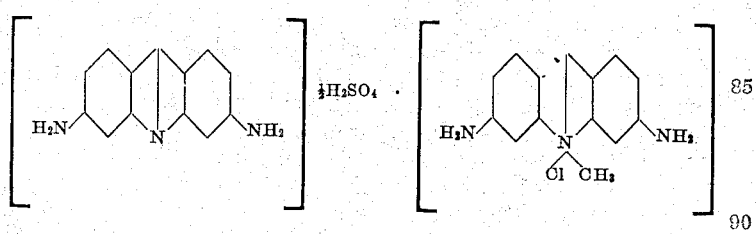

is thus obtained in the form of red crystals, which are soluble in water at room temperature to an extent of more than 20%.

Example 7

26.9 parts by weight of 3.6-diamino-acridine acetate are added to a solution of 27.8 parts by weight of 3.6-diamino-methylacridinium chloride (containing crystal water) in 500 parts by weight of water and the mixture thus obtained is heated to 90° C. for about 2 hours. After evaporation the double compound of the starting components is obtained in the form of deep brown crystals. It may be represented by the probable formula:

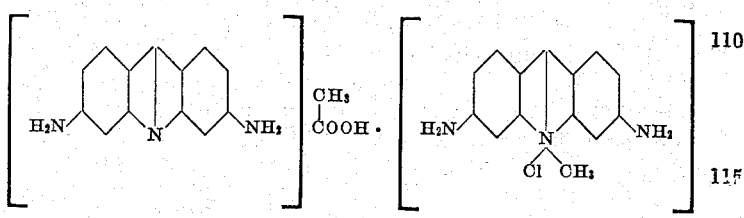

Example 8

39.5 parts by weight of 3.6-diamino-10-methyl-acridinium para-toluene sulfonate are introduced together with 38.1 parts by weight of 3.6-diamino-acridine para-toluene sulfonate into 1000 parts by weight of water; the mixture is heated to boiling for about three hours. When concentrating the solution thus obtained, the double compound of the starting materials crystallizes from the solution in the form of deep brown crystals.

The new compound may be represented by the probable formula:

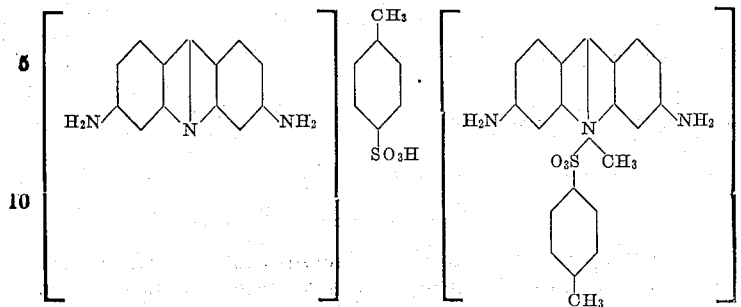

Example 9

100 parts by weight of a mixture of 93 parts by weight of 3.6-diamino-10-methyl-acridinium chloride and 7 parts by weight of 3.6-diamino-acridine hydrochloride (obtained by heating 4 parts by weight of 3.6-di-acetylamino-acridine dissolved in 40 parts by weight of nitrobenzene, with 3.3 parts by weight of para-toluenesulfonic acid methyl ester at a temperature of 175° C. and splitting off from the 3.6-di-acetylamino-10-methyl-acridinium para-toluenesulfonate formed the acetyl radicals by boiling 5.45 parts by weight of the reaction product with about 35 parts by weight of hydrochloric acid of about 20% strength) are dissolved in 500 parts by weight of water at about 80° C.; 81 parts by weight of anhydrous 3.6-diamino-acridine hydrochloride are then added. After about two hours' heating the double compound described in Example 1 is obtained by salting out or by evaporation to dryness.

Example 10

100 parts by weight of a technical mixture consisting, according to the analysis, of 45% of 3.6-diamino-10-methylacridinium chloride and 55% of 3.6-diamino-acridine hydrochloride are dissolved in 500 parts by weight of water. To the solution 14 parts by weight of .6-diamino-10-methylacridinium chloride + 1 aq. are added. After heating for a short time the formation of the double compound described in Example 1 is complete.

Example 11

So-called 3.6-di-acetylamino-10-methylacridinium-p-toluene sulfonate is prepared in the manner described in Example 9. When reacting upon this reaction product with diluted sulfuric acid, an acid sulfate is obtained which can be redissolved from water. According to the analysis, a mixture is thus obtained consisting of 93% of acid 3.6-diamino-10-methylacridinium sulfate and 7% of acid 3.6-diamino-acridine sulfate.

100 parts by weight of this mixture are dissolved in hot water and 55.7 parts by weight of 3.6-diamino-acridine are added, and the reaction mixture is heated to 80–90° C. for about 2 hours. Thereupon it is neutralized with a solution of caustic soda and caused to evaporate until the double compound, which is identical with that of Example 3, crystallizes out.

Example 12

150 parts by weight of 3.6-di-acetylamino-acridine are heated in 1450 parts by weight of nitrobenzene to about 90° C.; at this temperature 124 parts by weight of para-toluene sulfonic acid methylester are added, and the mixture is heated at 90° C. for about one hour. After cooling, the reaction product consisting of the tertiary and quaternary p-toluene sulfonate of 3.6-di-acetylamino-acridine in about molecular proportions is sucked off and saponified with hydrochloric acid of 20% strength. The acid salts thus obtainable are dissolved in hot water and the solution is neutralized with sodium carbonate. After warming the solution for a short time, the reaction product is salted out and sucked off. It is identical to that described in Example 1.

Example 13

150 parts by weight of 3.6-di-acetylamino-acridine and 124 parts by weight of para-toluene sulfonic acid methylester are heated in 1600 parts by weight of dichlorobenzene at 120° C. for about 5 hours. The reaction product is saponified by means of sulfuric acid of 20% strength. The mixture of compounds thus obtained consists of the acid tertiary an quaternary sulfate in molecular proportions. By neutralizing and redissolving from water, the product of Example 3 is obtained in a good yield.

Example 14

To a solution of 150 parts by weight of 3.6-di-acetylamino-acridine in 1450 parts by weight of nitrobenzene 70 parts by weight of para-toluene sulfonic acid methyl ester are added at a temperature of 150° C.; at this temperature the reaction mixture is further heated for 2 hours. After sucking off and saponifying the reaction product with sulfuric acid of 20% strength, a mixture of acid sulfates is obtained which can be converted into the neutral sulfate of the double compound described in Example 13, in the manner described in the said example.

We claim:—

1. Double compounds of the probable general formula:

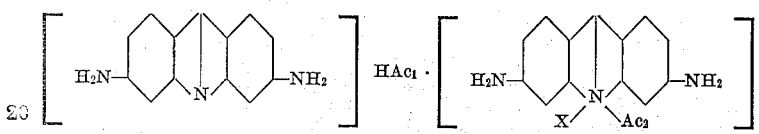

wherein $Ac_1$ and $Ac_2$ represent acid radicals and X stands for an alkyl group, said double compounds forming red crystals, being more soluble in water than each of their components and simple mixtures thereof, decomposing when heated without melting, being valuable therapeutical products especially for antiseptic purposes.

2. Double compounds of the probable general formula:

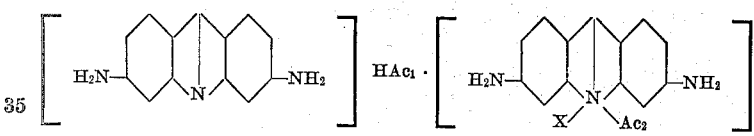

wherein $Ac_1$ and $Ac_2$ represent acid radicals and X stands for an alkyl group containing at the most two carbon atoms, said double compounds forming red crystals, being more soluble in water than each of their components and simple mixtures thereof, decomposing when heated without melting, being valuable therapeutical products especially for antiseptic purposes.

3. The new double compound of the probable formula:

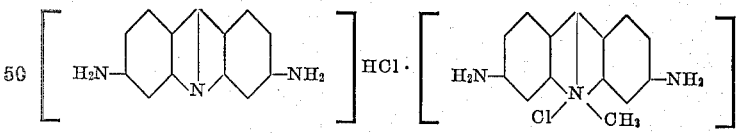

forming red crystals, being more soluble in water than each of its components and a simple mixture thereof, decomposing when heated without melting, being a valuable therapeutical product especially for antiseptic purposes.

4. The new double compound of the probable formula:

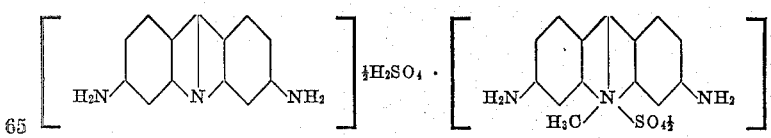

forming red crystals, being more soluble in water than each of its components and a simple mixture thereof, decomposing when heated without melting, and having valuable therapeutical properties.

5. The new double compound of the probable formula:

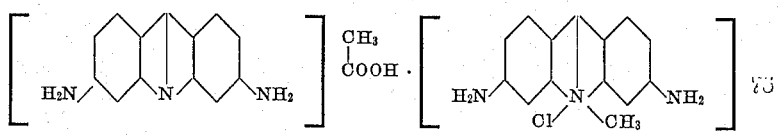

forming brown crystals, being more soluble in water than each of its components and a simple mixture thereof, decomposing when heated without melting, and having valuable therapeutical properties.

In testimony whereof, we affix our signatures.

KARL SCHRANZ.
HANS-PAUL MULLER.